United States Patent [19]

Heinze

[11] Patent Number: 4,793,621
[45] Date of Patent: Dec. 27, 1988

[54] SLIDING SLEEVE SEAL ASSEMBLY INCORPORATING REPLACEABLE ELASTOMERIC ELEMENT

[75] Inventor: John C. Heinze, Houston, Tex.
[73] Assignee: Baker Hughes Incorporated, Houston, Tex.
[21] Appl. No.: 129,604
[22] Filed: Dec. 7, 1987
[51] Int. Cl.⁴ .................. F16J 15/12; F16J 15/24
[52] U.S. Cl. ............................ 277/30; 277/166; 277/167.3; 277/185; 277/191
[58] Field of Search ............... 277/30, 166, 167.3, 277/178, 179, 181–187, 189, 190, 191

[56] References Cited

U.S. PATENT DOCUMENTS

| | | | |
|---|---|---|---|
| 2,071,197 | 2/1937 | Burns et al. | 277/166 X |
| 2,132,723 | 10/1938 | Crickmer et al. | 277/185 |
| 2,360,577 | 10/1944 | Parrish | 277/181 X |
| 2,548,412 | 4/1951 | Walker | 277/185 X |
| 3,079,205 | 2/1963 | Hugley | 277/179 X |
| 4,573,496 | 3/1986 | Richard | 277/166 X |

Primary Examiner—Robert S. Ward
Attorney, Agent, or Firm—Hubbard, Thurman, Turner & Tucker

[57] ABSTRACT

A seal assembly for sealing the annulus defined between two telescopically related cylindrical surfaces comprises an annular groove in one of the cylindrical surfaces haiving recessed end walls for receiving the axial end portions of an annular elastomeric element. A retaining C-ring is snapped into position to lie between the overhanging lip defined by one of the annular recesses and compress a reduced diameter end portion of the annular elastomeric seal element into snug engagement with the bottom of the groove.

8 Claims, 1 Drawing Sheet

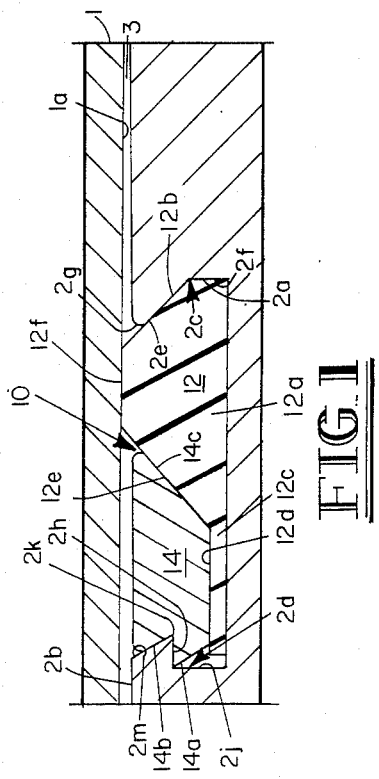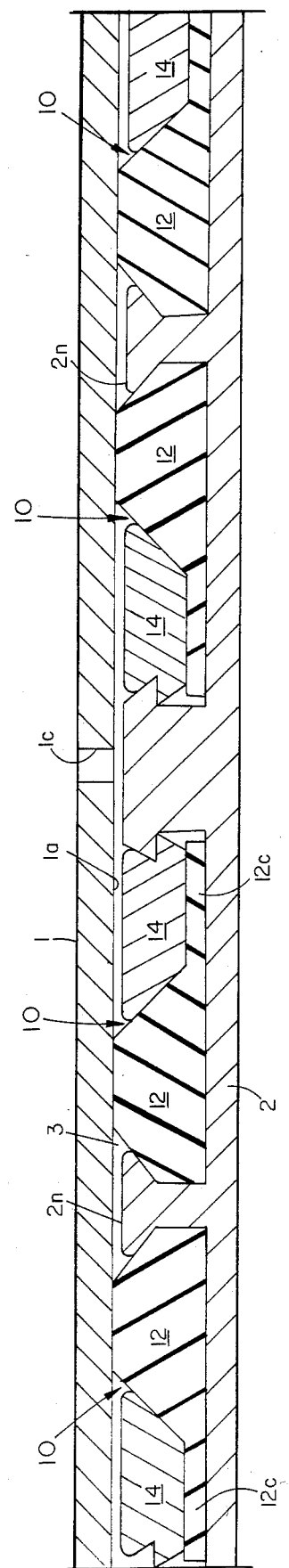

SLIDING SLEEVE SEAL ASSEMBLY INCORPORATING REPLACEABLE ELASTOMERIC ELEMENT

BACKGROUND OF THE INVENTION

1. FIELD OF THE INVENTION

A seal assembly for effecting a seal of the annulus defined between two telescopically related cylindrical surfaces, and particularly a seal assembly incorporating a readily replaceable annular elastomeric element.

2. SUMMARY OF THE PRIOR ART

Subterranean wells utilize many sleeve valves to perform down hole valving functions. Such sleeve valves typically constitute two telescopically related cylindrical bodies defining an annulus therebetween in which an annular seal is mounted and cooperates with a radial port in one of the cylindrical bodies to perform a valving function. Normally, an annular elastomeric sealing element performs the sealing function and in the case of dynamic valves wherein repeated movements of the one cylindrical body relative to the other occurs, it is quite common for the elastomeric real element to become pitted or abraded by such movement, particularly under high pressure conditions, so that the effective sealing life of the elastomeric sealing element is definitely limited.

The mountings for prior art elastomeric sealing elements have been unduly complicated so that replacement of an elastomeric sealing element requires a substantial disassembly and reassembly operation. There is a need, therefore, for a sleeve valve construction incorporating an annular elastomeric sealing element which can be readily removed and replaced by a new element without requiring any threaded disassembly or reassembly of components related to the sealing structure.

SUMMARY OF THE INVENTION

To provide a seal between two telescopically related cylindrical surfaces, one of said surfaces is provided with an annular groove. The end walls of the annular groove are both recessed to provide lips overhanging the bottom wall of the groove. An annular elastomeric seal element is provided having a radially thickened medial portion and axially opposed end portions. One such end portion is contoured to snugly fit within the recess in the one axial end of the annular groove. The other end portion of the annular elastomeric seal element is of generally cylindrical configuration and has a radial thickness less than the radial dimension of the recess into which it is inserted. A retaining ring, formed as a resiliently deformable C-ring is provided having one end portion which is snugly inserted beneath the overhanging lip of the recess accommodating the cylindrical portion of the annular elastomeric seal element, thus compressing such cylindrical portion of the annular elastomeric seal element and securing it in the particular cylindrical body.

Obviously, both the annular elastomeric seal element and the retaining C-ring are resiliently deformable to enable them to be inserted in the annular groove. Disassembly of the sealing elements is accomplished by again resiliently deforming the retaining C-ring to release same from the recess of the annular groove and thus release the annular elastomeric seal element for removal from the mounting groove by elastic deformation. Thus the assembly, the removal and the replacement of the elastomeric sealing element may be accomplished without the necessity of unthreading any components associated with the sealing structure. Such arrangement obviously greatly reduces the time required for replacement of worn seal elements in the field.

Further advantages of the invention will be readily apparent to those skilled in the art from the following detailed description, taken in conjunction with the annexed sheet of drawings, on which are shown two preferred embodiments of the invention.

BRIEF DESCRIPTION OF DRAWINGS

FIG. 1 is a sectional view of a sealing structure embodying this invention utilized to seal the annulus between two cylindrical, telescopically related bodies.

FIG. 2 is a sectional view illustrating a modified sealing structure embodying this invention for sealing the annulus between two cylindrical, telescopically related bodies.

DESCRIPTION OF PREFERRED EMBODIMENT

Referring to FIG. 1, a seal structure 10 embodying this invention is shown in assembled relationship in the annulus 3 defined between an outer body 1 having a cylindrical bore 1a and a telescopically related inner cylindrical body 2. An annular groove is provided in one of the cylindrical bodies, here illustrated as the groove 2a formed in the outer cylindrical surface 2b of the body 2.

The axial end walls of the groove 2a are provided with recesses 2c and 2d. The one recess 2c is defined by an inwardly sloping wall portion 2e and radial wall portion 2f, thus a lip 2g is disposed in overlying relationship to the bottom of the groove 2a is defined.

The other recess 2d in the other axial end wall of the groove 2a is provided with a generally rectangular configuration comprising a generally axially extending cylindrical wall 2h and a radial wall 2j, thus defining a lip 2k disposed in overlying relationship to the bottom of the groove 2a. Radial wall 2j of recess 2d is of substantially greater height than the radial wall 2f of the recess 2c.

The seal 10 embodying this invention comprises an annular elastomeric element 12 having an enlarged medial portion 12a sealingly engaging the bottom surface of groove 2a and the bore 1a of outer body 1. Elastomeric element 12 also has one end surface 12b contoured to snugly fit the inclined surface 2e and the radial surface 2f of the groove recess 2c. The other axial end of the elastomeric element 12 is of substantially tubular configuration as indicated at 12c and defines an outer cylindrical surface 12d and an outwardly inclined surface 12e. Inclined surface 12e in turn merges with an outer cylindrical sealing surface 12f which, as mentioned, is disposed in sealing engagement with the inner bore wall 1a of the cylindrical body 1.

The seal structure 10 further comprises a retaining C-ring 14 which is resiliently deformable to slip readily over the diameter of the inner body 2 and to snap into the groove 2a in overlying relationship to the tubular portion 12c of the elastomeric seal element 12. In this position, an axially extending lip 14a formed on the retaining C-ring 14 snugly engages beneath the overhanging lip 2k of the groove 2a and thus effects a compression of the tubular portion 12c of the elastomeric seal element 12 against the bottom of the groove 2a.

The retaining C-ring 14 is also provided with an outwardly inclined surface 14b which snugly conforms to the outwardly inclined surface 2m which completes the end wall of the groove 2a. An inclined surface 14c on retaining C-ring 14 conforms to inclined surface 12e on elastomeric seal element 12. It will therefore be apparent to those skilled in the art that the retaining C-ring 14 is snugly engaged within the groove 2a and also that it holds the annular elastomeric seal element 12 in snug engagement in such groove. Accordingly, when it is desired to replace the elastomeric seal element 12 due to damage suffered by such element in use, it is only necessary for the well mechanic to compress the retaining C-ring 14 to move same out from underneath the overhanging lip 2k, and then expand it to slip over the outer diameter of the inner cylindrical body 2. Once this has been done, the annular elastomeric seal element 12 can be readily deformed to slip over the maximum diameter of the cylindrical body 2 to be removed from the assemblage The replacement of a new annular elastomeric element is accomplished in reverse order.

Referring now to FIG. 2, there is shown a plurality of seal structures 10 embodying this invention which are utilized to effect the sealing of a radial port 1c formed in the outer cylindrical body 1. The inner cylindrical body 2 is now formed with a plurality of seal elements 10 mounted thereon in axially spaced relationship. The structures of such seals are, however, identical to these illustrated and described in connection with FIG. 1.

If you consider the two adjacent annular elastomeric seal elements 12 in FIG. 2 to constitute a single seal structure, then such seal structure may be defined as having a central retaining rib 2n. The annular elastomeric seal elements 12 are of the same overall configuration as described in FIG. 1 but are mounted in mirror image reversed relationship so that the tubular portions 12c thereof are disposed in opposite ends of the seal structure. Similarly, the retaining C-rings 14 are identical to that shown in FIG. 1 but are respectively installed in mirror image reversed relationship.

It will also be readily apparent to those skilled in the art that the annular groove within which the seal assemblies 10 are mounted could equally well be formed in the bore surface la of the outer body 1 and be equally effective in such location and readily assembled therein and removed therefrom. Thus, the total elimination of threading or unthreading operations to effect the assembly or disassembly of the seal structures has been eliminated, with a consequent reduction in manufacturing costs and in assembly and disassembly time.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A replaceable seal assembly· for effecting a seal between a telescopically related outer body having an internal cylindrical surface and an inner body having an external cylindrical surface; one of said cylindrical surfaces having an annular groove formed therein; said annular groove having axially spaced end walls and each end wall having an annular recess formed therein, thereby defining annular retaining lips respectively overlying a portion of the ends of said annular groove; an annular seal assembly mounted in said annular groove comprising annular elastomeric means having a radially enlarged body portion compressible between the bottom surface of said annular groove and the other cylindrical surface; said annular elastomeric means having end portions to respectively project into said annular recesses, one of said end portions being of reduced thickness to lie in radially spaced, underlying relation to one of said retaining lips; and a retainer C-ring having an axial end surface positioned beneath said one of said retaining lips and secured thereby in radial compressing relation to said reduced thickness end portion of said annular elastomeric means.

2. The apparatus o claim 1 wherein said elastomeric means and said retainer C-ring are resiliently deformable to permit assemblage into, and removal from said annular groove.

3. A replacealle seal assembly for effecting a seal between a telescopically related outer body having an internal cylindrical surface and an inner body having an external cylindrical surface; one of said cylindrical surfaces having an annular groove formed therein; said annular groove having axially spaced end walls and each end wall having an annular recess formed therein, thereby defining annular retaining lips respectively overlying a portion of the ends of said annular groove; an annular seal assembly mounted in said annular groove comprising an annular elastomeric element having a radially enlarged medial body portion compressible between the bottom surface of said annular groove and the other cylindrical surface; one axial end of said annular elastomeric element being shaped to conform to one of said annular recesses; the other axial end portion of said annular elastomeric element being of reduced thickness to project into the other of said recesses in radially spaced underlying relationship to the said other annular retaining lip; and a resiliently deformable retainer C-ring having an end surface positioned beneath said other annular retaining lip and secured thereby in radial compressing relation to said reduced thickness other end portion of said annular elastomeric element.

4. The apparatus of claim 3 wherein said elastomeric element and said retainer C-ring are resiliently deformable to permit assemblage into an removal from said annular groove.

5. A replaceable seal assembly for effecting a seal between a telescopically related outer body having an internal cylindrical surface and an inner body having an external cylindrical surface; said external cylindrical surface having an annular groove formed therein; said annular groove having axially spaced end walls and each end wall having an annular recess formed therein, thereby defining annular retaining lips respectively overlying a portion of the ends of said annular groove; an annular seal assembly mounted in said annular groove comprising annular elastomeric means having a radially enlarged body portion compressible between the bottom surface of said annular groove and said internal cylindrical surface; said annular elastomeric means having end portions to respectively project into said annular recesses, one of said portions being of reduced thickness to lie in radially spaced underlying relation to one said retaining lip; and a retainer C-ring having an axial end surface respectively positioned beneath said one retaining lip and secured thereby in radial compressing relation to said reduced thickness one end portion of said annular elastomeric means.

6. The apparatus of claim 5 wherein said elastomeric means and said C-ring are resiliently expandable to slip over said external cylindrical surface to permit assemblage into, and removal from said annular groove.

7. A dynamic seal for sealing the annulus between two axially shiftable, telescopically related cylindrical bodies comprising an annular groove formed in the cylindrical surface of one of said bodies; the end walls of said annular groove being respectively recessed to define annular lips overlying the ends of said grooves; an annular rib dividing said annular groove into two axially spaced sections, said rib having recessed side walls, whereby the one axial outer end of said rib overlies the end of one of said annular groove sections and the other axial outer end of said rib overlies the end of the other annular groove section; a pair of identical annular elastomeric seal elements respectively mounted in said annular groove sections; each said annular seal element having a radially enlarged medial portion sealingly engagable with the cylindrical surface of the other cylindrical body; each said annular seal element having one axial end portion snully conforming to the adjacent recessed side wall of said rib, and a reduced diameter other axial end portion insertable beneath the lip of the adjacent end wall of said annular groove and spaced radially inward relative to said lip; and a pair of identical retainer C-rings; each retainer C-ring having an axial end surface respectively positioned beneath said lips and secured thereby in radial compressing relation to said reduced diameter end portions of said annular elastomeric seals.

8. The apparatus of claim 6 wherein said elastomeric means and said retainer C-ring are resiliently deformable to permit assemblage into, and removal from said annular groove.

* * * * *